(12) United States Patent
Evans

(10) Patent No.: US 7,901,481 B2
(45) Date of Patent: Mar. 8, 2011

(54) CONCENTRATED SEPARATOR BY-PRODUCT BASED FERTILIZER

(75) Inventor: Jake Evans, Monterey, CA (US)

(73) Assignee: True Organic Products, Inc., Spreckels, CA (US)

( * ) Notice: Subject to any disclaimer, the term of this patent is extended or adjusted under 35 U.S.C. 154(b) by 889 days.

(21) Appl. No.: 11/670,364

(22) Filed: Feb. 1, 2007

(65) Prior Publication Data
US 2008/0184753 A1 Aug. 7, 2008

(51) Int. Cl.
*C05F 5/00* (2006.01)
(52) U.S. Cl. ......... 71/26; 71/23; 71/25; 71/64.1
(58) Field of Classification Search ......... 71/64.01, 71/44, 11–30
See application file for complete search history.

(56) References Cited

U.S. PATENT DOCUMENTS

| | | | |
|---|---|---|---|
| 1,501,916 A * | 7/1924 | Nikaido | ........... 71/26 |
| 1,599,185 A | 9/1926 | Reich | |
| 1,631,252 A | 6/1927 | Dickerson | |
| 2,049,524 A * | 8/1936 | Stillwell | ........... 71/26 |
| 2,117,087 A | 5/1938 | Formals | |
| 2,315,422 A | 3/1943 | Hilderbrant | |
| 2,626,237 A | 1/1953 | Warren | |
| 2,738,264 A | 3/1956 | Watson | |
| 3,445,220 A | 5/1969 | Anderson | |
| 3,983,255 A | 9/1976 | Bass | |
| 4,126,439 A | 11/1978 | Stekoll | |
| 4,230,485 A * | 10/1980 | Ohlrogge | ......... 504/353 |
| 4,424,151 A | 1/1984 | Grealy et al. | |
| 4,604,125 A | 8/1986 | Robertiello et al. | |
| 4,743,287 A | 5/1988 | Robinson | |
| 4,997,469 A | 3/1991 | Moore | |
| 5,631,001 A * | 5/1997 | Harich et al. | ........... 424/58 |
| 5,772,721 A * | 6/1998 | Kazemzadeh | ........... 71/11 |
| 6,083,293 A | 7/2000 | Bath | |
| 6,174,472 B1 | 1/2001 | Johnson et al. | |
| 6,318,023 B1 | 11/2001 | Yamashita | |
| 6,352,569 B1 | 3/2002 | Beran et al. | |

(Continued)

FOREIGN PATENT DOCUMENTS

GB 663133 12/1951

(Continued)

OTHER PUBLICATIONS

"Effects of Concentrated Separator Dried Beet Pulp on Nutrient Digestibility, Milk Production,and Preference of Holstein Cattle," R. D. Wiedmeier, C. W. Arave, M. J. Arambel, B. A. Kent, and J. L. Walters, 1994 J Dairy Sci 77:3051-3057. Midwest Agri CommoditiesRaffinate ( Desugared Beet Molasses) Jul. 10, 2001.
"Raw Juice Chromatographic Separation Process" published in the Proceedings from the 28th Biennial ASSBT Meeting, Operations, New Orleans, LA, Mar. 8-11, 1995, by Kearney, Kochergin, Petersen, Velasquez and Jacob of Amalgamated Research Inc.

(Continued)

*Primary Examiner* — Wayne Langel
*Assistant Examiner* — Pritesh Darji
(74) *Attorney, Agent, or Firm* — Gunnison, McKay & Hodgson, L.L.P.; Philip McKay

(57) ABSTRACT

A vegetable based fluidic fertilizer derived from concentrated separator by-products (CSB.) The CSB is heat treated and optionally filtered to remove suspended particular matter. The heat treatment is performed in a range of about 150 to 200 degrees F. for about 24 to 96 hours. Filtration is provided using a standard wire mesh size in a range of about 50 to 200. The fertilizer may then be applied at about 25 to 200 gallons per acre. The fertilizer may be applied to agricultural vegetation either directly or by inclusion in an irrigation stream.

19 Claims, 1 Drawing Sheet

U.S. PATENT DOCUMENTS

| | | |
|---|---|---|
| 6,524,600 B2 | 2/2003 | Yamashita |
| 6,572,669 B1 | 6/2003 | Creech |
| 6,602,824 B1 | 8/2003 | Miles et al. |
| 7,018,669 B2 * | 3/2006 | Kosaka et al. ............... 426/634 |
| 7,045,165 B2 | 5/2006 | Westberg |
| 7,074,251 B1 | 7/2006 | Rogers et al. |
| 2003/0066322 A1 | 4/2003 | Perriello |
| 2003/0172697 A1 | 9/2003 | Sower |
| 2004/0062832 A1 | 4/2004 | Kemp |
| 2004/0065127 A1 | 4/2004 | Connell |
| 2006/0243009 A1 | 11/2006 | Burnham |
| 2006/0254331 A1 | 11/2006 | Burnham |
| 2007/0261451 A1 | 11/2007 | Beckley et al. |

FOREIGN PATENT DOCUMENTS

| | | |
|---|---|---|
| JP | 63-107907 | 5/1988 |
| JP | 2004168614 A * | 6/2004 |

OTHER PUBLICATIONS

Analytical data, Evans 2004-2006.

Evans, "Concentrated Separator By-Product and Fish Soluble By-Product Based Fertilizer", U.S. Appl. No. 12/187,043, filed Aug. 6, 2008.

* cited by examiner

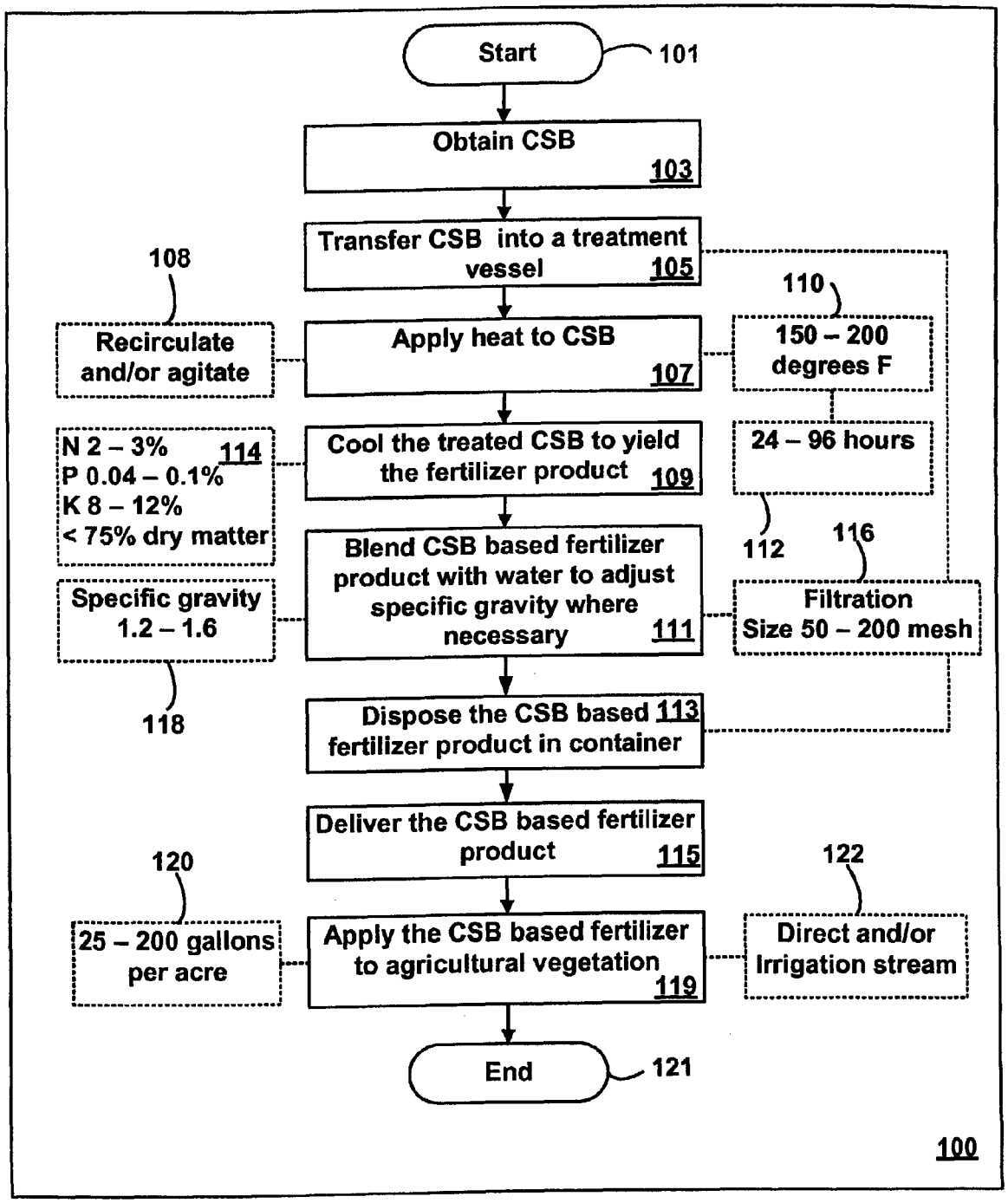

CONCENTRATED SEPARATOR BY-PRODUCT BASED FERTILIZER

CROSS-REFERENCE TO RELATED APPLICATIONS

Not applicable

FEDERALLY SPONSORED RESEARCH AND DEVELOPMENT

Not Applicable

REFERENCE TO A MICROFICHE APPENDIX

Not Applicable

RELEVANT INVENTIVE FIELD

The relevant inventive field is directed toward agricultural products and more specifically toward organically derived fertilizers.

BACKGROUND

Over the years, a number of different types of fertilizer compositions have been developed and employed in agriculture. However, there is continued interest in the development of new fertilizer compositions which do not rely on synthetic chemicals. Specifically, there is increasing public concern over the potential link between pesticide use and human disease and/or poisoning conditions. As such, organic fertilizer compositions, which are typically derived from natural sources and therefore reduce the risk of introducing pathogens into the food supply, are in significantly high demand.

The desirable chemical nutrients of these organic fertilizer compositions include, but are not limited to, bioavailable phosphorous, potassium and nitrogen in concentrations beneficial to the agricultural vegetation to which the organic fertilizer composition is to be applied. Desirable characteristics of organic fertilizer compositions include, but are not limited to: the ability to directly inject the organic fertilizer compositions into irrigation streams; time-released nitrogen components which become bioavailable to agricultural vegetation by beneficial microbial digestion in the soil in which the agricultural vegetation is planted; and the elimination of crop burning and undesirable runoff situations.

Over the years various efforts have been expended to utilize waste products generated by fermentation and refined sugar processing as organic fertilizer compositions. These efforts have included deriving organic fertilizer compositions from malt extracts and/or spent grain liquor; treating molasses to recover in solid form potash and nitrogen for use as an organic fertilizer composition; deriving organic fertilizer compositions from commercially available molasses; deriving thixotrophic fertilizer compositions from organic materials including molasses; and deriving organic fertilizer compositions from yeast/black strap molasses. However, many of these organic fertilizer compositions require significant chemical processing and/or the addition of synthetically derived chemicals.

Therefore, an environmentally benign and non-pathogenic fertilizer derived from a natural organic source which does not require significant processing would be highly desirable in the relevant art. Unless otherwise indicated herein, the approaches described in this section are not prior art to the claims in this application and are not admitted to be prior art by inclusion in this section.

SUMMARY

The various exemplary embodiments described herein address the limitations in the relevant art and provides in a method for production of a vegetable based fertilizer product, a fertilizer product and uses of the fertilizer product thereof. The vegetable fertilizer product is derived from concentrated separator by-products (CSB.) The CSB is heat treated and optionally filtered to remove suspended particular matter. The heat treatment is performed in a range of about 150 to 200 degrees F. for 24 to 96 hours. Filtration is provided using a standard wire mesh size in a range of 50 to 200. The fertilizer may then be applied at about 25 to 200 gallons per acre. The fertilizer may be applied to agricultural vegetation either directly or by inclusion in an irrigation stream.

BRIEF DESCRIPTION OF THE DRAWINGS

Common reference numerals are used throughout the FIGURE and the detailed description to indicate like elements. One skilled in the relevant art will readily recognize that the FIGURE is only exemplary and that other treatment arrangements, production modes, orders of operation and elements/functions can be provided and implemented without departing from the characteristics and features of the various inventive embodiments as set forth in the Claims.

The Figure depicts a flow chart of a process for manufacturing a CSB based fertilizer product in accordance with an exemplary inventive embodiment.

DETAILED DESCRIPTION

Concentrated separator byproduct (CSB) is the residual liquid resulting from the desugaring of beet molasses and is available in bulk tanker-truck quantities. For example, CSB is commercially available from a number of suppliers including MidWest Agri-Commdities of Moorhead, Minn. Information concerning this company is available from the Internet at URL www.mwagri.com.

In the relevant art, CSB is generally used as a supplement in ruminant feedstock (see U.S. Pat. No. 7,045,165 to Westberg) but has not been considered to be useful as a direct application fluidic fertilizer due to historically low concentrations of the essential nutrients remaining in the solution from the molasses desugaring process. Recently, the processing efficiency of sugar refineries has improved by the advent of chromatographic extraction techniques. The improved chromatographic extraction also improves the nutrient concentrations in the remaining CSB solution, known in the relevant art as raffinate. For purposes of this specification, the term raffinate is the residual liquid resulting from the desugaring of beet molasses.

A discussion of the improved chromatographic separation process currently practiced by many sugar refiners is provided in "Raw Juice Chromatographic Separation Process" published in the Proceedings from the 28th Biennial ASSBT Meeting, Operations, New Orleans, La., Mar. 8-11, 1995, by Kearney, Kochergin, Petersen, Velasquez and Jacob of Amalgamated Research Inc.

The instant inventor, believing the conventional wisdom regarding CSP nutrient concentrations, attempted to mix seaweed and fish products into a quantity of CSB to increase the concentration of bioavailable nitrogen and potassium but was not able to generate a consistent product suitable for commercial applications. Moreover, the introduction of fish and kelp required more extensive processing, increased production costs and raised the probability of introducing pathogenic organisms into the resulting fertilizer product.

In light of the conventional wisdom regarding CSB nutrient concentrations, and long standing practices in the relevant art, the instant Inventor attempted to mix seaweed and fish products into a quantity of CSB to increase the concentration of bioavailable nitrogen and potassium. However, using this method, the present Inventor was not able to generate a consistent CSB based fertilizer product suitable for commercial applications.

Moreover, the introduction of fish and kelp required more extensive processing, increased production costs, and raised the probability of introducing pathogenic organisms into the resulting CSB based fertilizer product.

Seeking an alternative to supplementing the CSB with fish and kelp and/or undesirable synthetic ingredients to create a CSB based fertilizer product, the present Inventor discovered that supplementation was unnecessary if the CSB were properly heat-treated. Apparently, to the present Inventor's surprise, and contrary to conventional wisdom and practice in the relevant art, heat-treating the CSB denatures the heat liable vegetable proteins contained in the CSB sufficiently to allow additional nitrogen to become bioavailable. Likewise, phosphorous apparently becomes more available as vegetative nucleosides are broken down by both the original de-sugaring process and the added heat-treatment process.

To his surprise, the present Inventor discovered that the heat treatment of the CSB resulted in a CSB based fertilizer product having sufficient bioavailable nitrogen, potassium and phosphorous for direct application to agricultural vegetation in a readily pumpable fluid state. These surprising and unexpected results are shown as analytical concentrations of key nutrients in Table 1 below.

TABLE 1

Range of Nutrients in CSB (By weight)

| Parameter | Range | Average |
| --- | --- | --- |
| Dry matter | 50-75% | 65.0% |
| Nitrogen (N) | 1.4-3.0% | 2.4% |
| Phosphate (P) | 0.02-0.14% | 0.06% |
| Potash (K) | 9.0-11.8% | 10.8% |
| pH | 7.2-9.9 | 8.4 |

The range of nitrogen values was determined by multiplying crude protein fractions by 6.25 (see U.S. Pat. No. 4,424,151 to Grealy et al.)

In an exemplary embodiment, natural proteases may be added in lieu of, or in conjunction, with the heat treatment; however, this could increase production costs and potentially allow pathogens to remain in the CSB based fertilizer product if heat treatment is not provided.

In practice, the CSB is offloaded from a tanker-truck and into a treatment vessel. The CSB being offloaded from the tanker truck may be filtered as the CSB is being disposed into the treatment vessel. This step is optional, as the amount of suspended particular matter has been found to be minimal. If pretreatment filtration is desired, a stainless steel mesh having a standard mesh size number between about 50 and 200 may be employed. A typical standard mesh size number used is 100.

The treatment vessel is typically an insulated stainless steel tank having electrically powered heat strips applied thereto. However, the tank construction and heating mechanism are not critical to the treatment process. For example, a carbon steel tank which is heated by steam supplied by a package boiler or cogeneration facility would work as well. Moreover, the slightly basic pH of the CSB is not considered particularly corrosive to the metals commonly used in the construction of metal treatment vessels. One skilled in the art will appreciate that other non-metallic treatment vessels may be employed as well.

Once disposed in the treatment vessel, heat is applied to the CSB in order to raise the average temperature at or above 150 degrees Fahrenheit (F) and preferably closer to 200 degrees F. This temperature range is known to inhibit pathogenic bacterial growth of the most common pathogens. For example, *Escherichia coli* O157:H7 and *Salmonella*.

In an alternate embodiment, the CSB may be pretreated with proteolytic enzymes to further break down the vegetable proteins contained in the CSB before the heat treatment is performed. The quantity of proteolytic enzymes to be included and the length of treatment will need to be determined experimentally. The proteolytic enzyme treatment may also be performed in conjunction with a slow heating of the CSB. Once, the CSB exceeds about 150 degrees Fahrenheit (F.), the proteolytic enzymes are denatured and become part of the fertilizer solution.

The CSB is maintained in the treatment vessel at or above 150 degrees F. for at least 24 hours to ensure uniform heat transfer to the CSB. To aid in uniform heat transfer, an agitator or pumped recirculation flow may be included as part of the treatment process. If recirculation is used to maintain the uniform heat treatment of the CSB, filtration may also be accomplished concurrently by placement of a suitable filter screen as discussed above, into the recirculation flow path. The heat treatment may be performed for up to 96 hours if desired. However, for energy conservation reasons 24 to 48 hours of heat treatment is believed to be adequate.

Optionally, water may be blended with the heat treated CSB to reduce the specific gravity to a range of about 1.2 to 1.6. Water may also be used to recover losses due to evaporation during the heat treatment process. However, water blending is typically not required. Maintaining the specific gravity of the heat treated CSB to a specific gravity range of about 1.2 to 1.6 allows a broad range of existing agricultural transfer pumps to be used and greatly simplifies the application of the CSB to agricultural vegetation.

Once the heat treatment has been completed, the CSB is allowed to cool in the treatment vessel before being transferred in bulk to a tanker truck and/or disposed into drums for delivery of smaller quantities of the CSB. The heat treated CSB is then delivered to farms for application to the agricultural vegetation. Typically, a quantity of the heat treated CSB is offloaded into plastic field tanks located at or near the application site. The plastic field tanks may then be used to feed CSB into the irrigation stream either by direct injection or by vacuum drawing from the irrigation flow.

Depending on the particular agricultural vegetation requirements, the application rate may be anywhere in a range of about 25 to 200 gallons per acre. The application of the CSB may also be directly sprayed onto the agricultural vegetation without concerns of plant burning as may occur with more concentrated inorganic fertilizers.

Referring to the Figure, and in accordance with one exemplary embodiment, a process for production of a CSB based fertilizer product 100 is provided where a CSB based fertilizer product that is environmentally benign, non-pathogenic, is derived from a natural organic source, and does not require significant processing. The CSB based fertilizer product is derived from concentrated separator by-product, hereinafter referred to as CSB, resulting from the de-sugaring of beet molasses. In the depicted exemplary embodiment, the process is initiated 101 by obtaining a quantity of CSB 103. The CSB is transferred to a treatment vessel 105.

The CSB is then heat treated 107 and, in one exemplary embodiment, optionally filtered to remove suspended particular matter 116. The heat treatment is performed in a range of about 150 to 200 degrees Fahrenheit (F.) 110 for about 24 to 96 hours 112. In one exemplary embodiment, filtration may be provided using a standard wire mesh size in a range of about 50 to 200 116. In one embodiment, a recirculation flow and/or agitation 108 may be provided to ensure uniformity in the heat treatment process 107.

The CSB is then cooled to yield the CSB based fertilizer product 109. In one exemplary embodiment, the specific gravity of the CSB based fertilizer product may be adjusted by blending the CSB based fertilizer product with water to arrive at specific gravity in a range of about 1.2 to 1.6 118. In one exemplary embodiment, the CSB based fertilizer product comprises bioavailable nitrogen in range of about 2 to 3% by weight; phosphorous (as phosphate) in a range of about 0.04 to 0.1% by weight; potassium (as potash) in a range of about 8 to 12% by weight; and dry matter less 75% by weight 114. The CSB based fertilizer product is then disposed in a container 113 for delivery to a site for application. In one exemplary embodiment, filtration may be provided at this point in the process as well 116.

The CSB based fertilizer product is then delivered to the application site 115 and applied to agricultural vegetation 119. The CSB based fertilizer product is then applied to the agricultural vegetation in quantities in the approximate range of about 25 to 200 gallons per acre 120. In one exemplary embodiment, the CSB based fertilizer product disclosed herein may be applied to the agricultural vegetation either directly or by inclusion in an irrigation stream 122. Following application of the CSB based fertilizer product to the agricultural vegetation, the exemplary process is concluded 121.

The foregoing described exemplary embodiments are provided as illustrations and descriptions. They are not intended to limit an inventive scope to any precise form or sequence described. Other variations and embodiments are possible in light of above teachings, and it is not intended that this Detailed Description limit the scope of inventive embodiments, but rather by the claims following herein.

It should also be noted that the language used in the specification has been principally selected for readability, clarity and instructional purposes, and may not have been selected to delineate or circumscribe the inventive subject matter. Accordingly, the disclosure of various inventive embodiments is intended to be illustrative, but not limiting, of the inventive scope, which is set forth in the claims following herein.

What is claimed:

1. A method of manufacturing a CSB based fertilizer product comprising:
   obtaining a quantity of un-supplemented CSB, the quantity of un-supplemented CSB consisting of CSB, the un-supplemented CSB thus including no supplementary additives in the CSB;
   transferring the quantity of un-supplemented CSB to a treatment vessel; and
   heat-treating the quantity of un-supplemented CSB above 150 degrees F. for at least 24 hours.

2. The method of manufacturing a CSB based fertilizer product according to claim 1 further comprising filtering the quantity of un-supplemented CSB using a filter having a standard wire mesh size number of at least 50.

3. The method of manufacturing a CSB based fertilizer product according to claim 1 wherein the heat-treating is performed such that an average temperature of the un-supplemented CSB is maintained in a range of about 150 to 250 degrees F. for about 24 to 96 hours.

4. The method of manufacturing a CSB based fertilizer product according to claim 2 wherein the filtering is accomplished using a filter having a standard wire mesh size number in a range of about 50 to 200.

5. The method of manufacturing a CSB based fertilizer product according to claim 1 further comprising blending the quantity of un-supplemented CSB with water to achieve a solution of CSB having a specific gravity in the range of about 1.2 to 1.6.

6. The method of manufacturing a CSB based fertilizer product according to claim 1 further comprising disposing the CSB based fertilizer product in a container for transport.

7. The method of manufacturing a CSB based fertilizer product according to claim 1 wherein the CSB based fertilizer product has less than 75% dry matter.

8. The method of manufacturing a CSB based fertilizer product according to claim 1 wherein the CSB based fertilizer product includes a nitrogen content in a range of about 2 to 3 percent by weight.

9. The method of manufacturing a CSB based fertilizer product according to claim 1 wherein the CSB based fertilizer product includes a phosphate content in a range of about 0.04 to 0.1 percent by weight.

10. The method of manufacturing a CSB based fertilizer product according to claim 1 wherein the CSB based fertilizer product includes a potash content in a range of about 8 to 12 percent by weight.

11. A method for fertilizing agricultural vegetation comprising:
    obtaining a quantity of un-supplemented CSB, the quantity of un-supplemented CSB consisting of CSB the un-supplemented CSB thus including no supplementary additives in the CSB;
    transferring the quantity of un-supplemented CSB to a treatment vessel;
    heat-treating the quantity of un-supplemented CSB above 150 degrees F. for at least 24 hours;
    cooling the quantity of un-supplemented CSB to produce a CSB based fertilizer product; and
    applying the CSB based fertilizer product to the agricultural vegetation.

12. The method for fertilizing agricultural vegetation according to claim 11 further comprising filtering the quantity of un-supplemented CSB using a filter having a standard wire mesh size number of at least 50.

13. The method for fertilizing agricultural vegetation according to claim 11 wherein the heat-treating is performed such that an average temperature of the un-supplemented CSB is maintained in a range of about 150 to 250 degrees F. for about 24 to 96 hours.

14. The method for fertilizing agricultural vegetation according to claim 12 wherein the filtering is accomplished using a filter having a standard wire mesh size number in a range of about 50 to 200.

15. The method for fertilizing agricultural vegetation according to claim 11 further comprising blending the quantity of un-supplemented CSB with water to achieve a solution of un-supplemented CSB having a specific gravity in the range of about 1.2 to 1.6.

16. The method for fertilizing agricultural vegetation according to claim 11 wherein the CSB based fertilizer product includes a nitrogen content in a range of about 2 to 3 percent by weight.

17. The method for fertilizing agricultural vegetation according to claim 11 wherein the CSB based fertilizer product includes a phosphate content in a range of about 0.04 to 0.1 percent by weight.

18. The method for fertilizing agricultural vegetation according to claim 11 wherein the CSB based fertilizer product includes a potash content in a range of about 8 to 12 percent by weight.

19. The method for fertilizing agricultural vegetation according to claim 11 wherein applying the CSB based fertilizer product to the agricultural vegetation is performed at a rate of about 25 to 200 gallons per acre.

* * * * *